UNITED STATES PATENT OFFICE.

HENRY M. BROOKFIELD, OF NEW YORK, N. Y.

GLASS AND ART OF MAKING THE SAME.

1,136,504.

Specification of Letters Patent. Patented Apr. 20, 1915.

No Drawing. Application filed January 27, 1912. Serial No. 673,716.

*To all whom it may concern:*

Be it known that I, HENRY M. BROOKFIELD, a citizen of the United States, residing at New York city, New York, have invented certain new and useful Improvements in Glass and Art of Making the Same, of which the following is a clear, full, and exact description.

The object of the present invention is to obtain a vitreous product of tough, hard and durable quality which can be worked like plastic glass into various shapes such as insulators. The product obtained from this process may be suitably called a glass compound since it takes on the character of glass to a large degree and consists in a mixture of glass material with an ingredient for giving toughness and hardness thereto. This toughening ingredient which may be one of the common clays used in porcelain making is added to the glass in suitable proportions so as not to destroy the vitreous character of the product but on the contrary to remain sufficiently plastic after fusion to be molded and pressed in the various shapes desired.

In carrying out my process I first pulverize a quantity of previously formed glass or cullet and thoroughly mix with the same a suitable percentage of pulverized clay or its equivalent. The cullet may be obtained from ordinary scrap glass containing portions of lime or lead glass, but if manufactured particularly for this process, the lime glass is preferred on account of its cheapness. The clays suitable for my purpose may be either the primary clays such as kaolin, or the secondary clays commonly known as pipe or ball clay, although the more infusible clays such as the fire clays containing large quantities of free silica, quartz, etc., are less preferred. The two ingredients of my mixture, namely, the cullet and the clay, may be ground to a powder either separately and afterward mixed, although I prefer to grind them together to obtain a more thorough and intimate mixture. This mixture is then heated to approximately 2500° Fahrenheit for fusing the same and rendering the mass sufficiently plastic so as to be workable into glass articles. The proportion of clay in the mixture may be varied widely, but is preferably kept small enough so that the mixture will not be absolutely infusible at the temperature stated. On the other hand this proportion of clay may be large enough to cause the mass to only partially fuse into a semi-plastic, semi-liquid condition which is workable into articles. I have found that suitable proportions for the original mixture are 30 pounds of clay or equivalent, to every 100 pounds of cullet. If too large a percentage of clay is added to the mixture, the mass upon heating will not be sufficiently fused to become homogeneous, since portions of the clay collect in irregular unfused lumps throughout the mass. If desired, pulverized lime $CaO$ may also be added together with the clay to the cullet, as an ingredient of the original mixture, since it increases the fusibility of the clay, and also possesses the same quality as clay in rendering the resulting product tough and durable.

It will thus be seen that by the present process a vitreous product of amorphous character is produced having all of the advantageous characteristics of glass in being plastic and workable, and yet tougher and more durable than ordinary glass products.

What I claim is:

1. The process of making a glass compound, which is non-crystalline in character, which consists in thoroughly mixing pulverized glass or cullet with pulverized clay, the proportion of glass being comparatively large, subjecting the same to an approximate heat of 2500° F., cooling and annealing the same.

2. The process of making a glass compound, which is non-crystalline in character, which consists in thoroughly mixing pulverized glass or cullet with pulverized clay and lime, the proportion of glass being comparatively large, subjecting the same to approximate heat of 2500° F., cooling and annealing the same.

3. The process of making a glass compound, which is non-crystalline in character, which consists in thoroughly mixing pulverized glass or cullet with pulverized clay in approximate proportions of 100 lbs. of glass to every 30 lbs. of clay, subjecting the same to an approximate heat of 2500° F., cooling and annealing the same.

4. As a new composition of matter, a batch for the manufacture of a non-crystalline glassy product comprising a pulverized glass or cullet thoroughly mixed with pulverized clay, the quantity of pulverized glass in said batch being large in proportion to the quantity of clay therein.

5. The product of manufacture comprising a non-crystallized compound of glass and clay in approximate proportions by weight of 100 parts of glass to 30 parts of clay fused together into a homogeneous mass.

Signed at New York city, New York, this 26" day of January, 1912.

HENRY M. BROOKFIELD.

Witnesses:
 BEATRICE MORRIS,
 ABRAM BERNSTEIN.